F. HANSON.
ZIGZAG HARROW.
APPLICATION FILED MAR. 27, 1913.
1,091,131.
Patented Mar. 24, 1914.
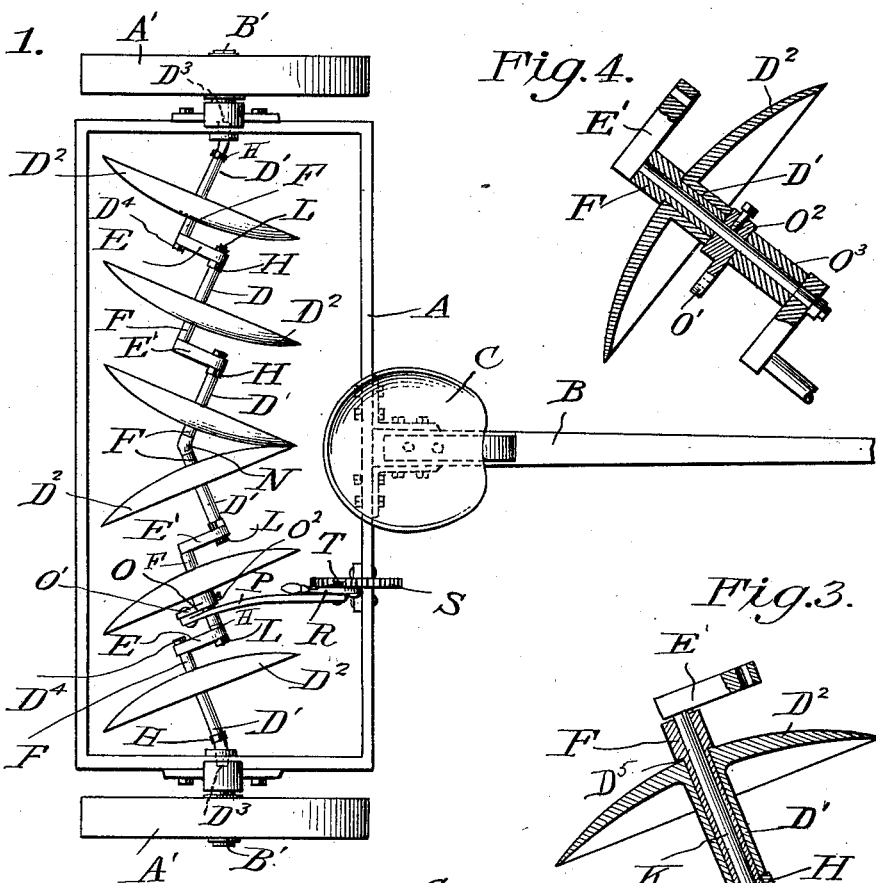
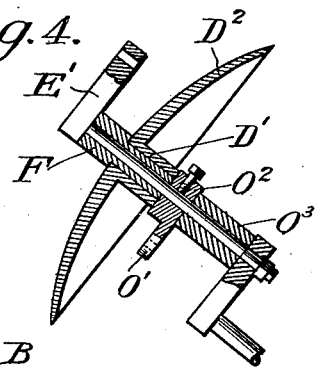
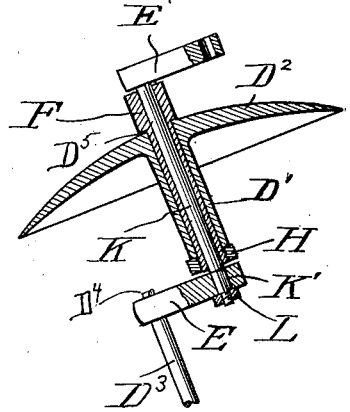
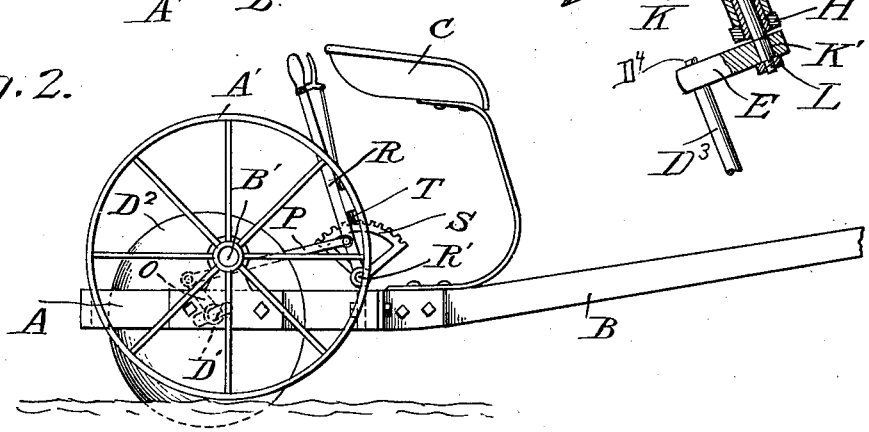
WITNESSES
INVENTOR
Freeman Hanson

UNITED STATES PATENT OFFICE.

FREEMAN HANSON, OF HOLLIS CENTER, MAINE.

ZIGZAG HARROW.

1,091,131.

Specification of Letters Patent. Patented Mar. 24, 1914.

Application filed March 27, 1913. Serial No. 757,237.

*To all whom it may concern:*

Be it known that I, FREEMAN HANSON, a citizen of the United States, residing at Hollis Center, in the county of York and State of Maine, have invented certain new and useful Improvements in Zigzag Harrows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in rotary disk harrows and the object in view is to produce an apparatus of this nature comprising a series of disks having a zigzag shaft, the disks being so mounted thereon that the outer edges of the disks will be in straight parallel lines rather than mounted with the series of disks on either side of the center in lines which are at angles to each other as is commonly the practice.

The invention consists of various details of construction and combinations and arrangements of parts which will be hereinafter fully described, shown in the accompanying drawings and then specifically defined in the appended claim.

I illustrate my invention in the accompanying drawings, in which:—

Figure 1 is a top plan view of my zigzag harrow. Fig. 2 is an end elevation. Fig. 3 is a sectional view through one of the disks, and Fig. 4 is a detail sectional view through a collar which is fixed to one of the shaft sections.

Reference now being had to the details of the drawings by letter, A designates a frame having a tongue B and a seat C. Said frame is provided with stub shafts B' upon which the wheels A' are mounted.

Sectional shafts, arranged in zigzag relation to one another, are provided, made up of sections the end ones being designated by letter $D^3$, the outer ends of which have bearings in the opposite ends of the frame as shown.

A plate E has an aperture for the reception of the angular end of a shaft section K and a nut L is fitted to the threaded end of said section K. Said shaft section K has an integral laterally projecting arm E' at one end thereof which is provided with an aperture for the reception of one arm of the central angular section N and to which arm of the central section a nut L is fastened.

End shaft sections, designated by letter $D^3$, are bent at an angle and have their outer ends journaled in bearings in the frame and the inner end of each passes through an aperture in the plate E and is held by means of a nut $D^4$. Sleeves F are journaled upon each of the shaft sections and each sleeve is provided with a shoulder $D^5$, one of which is shown in section in Fig. 3 of the drawings, and against which shoulder a disk $D^2$ is adapted to contact, said disk having a hollow shank portion D' journaled upon the sleeve, and nuts H are fitted to the threaded portion of the sleeve and adapted to bear against the hollow shank portion D' of the disks.

A crank arm, designated by letter O, integral with a collar $O^2$, is fixed to one shaft section K and a spacing washer $O^3$ is interposed upon the shaft section K intermediate the collar $O^2$ and the adjacent plate E pivotally connected to a lever R mounted upon the pivot pin R' and a pawl T is carried by said lever and is adapted to engage the teeth of the segment S, forming a convenient means whereby the shaft made up of a series of zigzag sections may be raised or lowered as desired.

By the provision of a harrow made in accordance with my invention, it will be noted that the various disks mounted thereon will be disposed with their forward and rear edges in parallel lines and capable of being raised or lowered in the usual manner where harrow disks are arranged upon two shafts which are at angles to each other and which make it necessary that the various disks be in two different lines corresponding to the angles of the shafts upon which they are carried.

What I claim to be new is:—

A disk harrow comprising a frame, a centrally disposed angular shaft section, plates secured to and at right angles with the arms of said central section, an integral shaft section projecting from each plate at right angles thereto, and parallel to the adjacent arm of said central section, end shaft sections each having its outer end journaled in said frame, other plates fastened one to each of said integral shaft sections and end sections, each of said end sections being bent at an angle and having a bearing in the frame, shouldered sleeves journaled upon said sections, disks having hollow shank portions journaled upon said sleeves, nuts fitted upon the sleeves and bearing against the ends of said hollow shank portions of the disks, a collar fixed to one of the sections and provided with an integral arm, and a swinging lever mounted upon the frame and having pivotal link connections with said arm, as set forth.

In testimony whereof I hereunto affix my signature in presence of two witnesses.

FREEMAN HANSON.

Witnesses:
WM. M. BRADLEY,
A. G. McPHERSON.

Copies of this patent may be obtained for five cents each, by addressing the "Commissioner of Patents, Washington, D. C."